(12) United States Patent
Trantham et al.

(10) Patent No.: US 10,157,631 B2
(45) Date of Patent: Dec. 18, 2018

(54) SLIDER UTILIZING MULTIPLE TRANSDUCER SETS

(71) Applicant: Seagate Technology LLC, Cupertino, CA (US)

(72) Inventors: Jon D. Trantham, Chanhassen, MN (US); Jason Bryce Gadbois, Shakopee, MN (US); Mehmet Faith Erden, St. Louis Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/873,126

(22) Filed: Jan. 17, 2018

(65) Prior Publication Data

US 2018/0144764 A1   May 24, 2018

Related U.S. Application Data

(63) Continuation of application No. 15/291,290, filed on Oct. 12, 2016, now Pat. No. 9,875,758.

(51) Int. Cl.
| | |
|---|---|
| *G11B 21/02* | (2006.01) |
| *G11B 5/29* | (2006.01) |
| *G11B 5/596* | (2006.01) |
| *G11B 5/31* | (2006.01) |

(52) U.S. Cl.
CPC .............. *G11B 5/29* (2013.01); *G11B 5/3133* (2013.01); *G11B 5/596* (2013.01)

(58) Field of Classification Search
None
See application file for complete search history.

(56) References Cited

U.S. PATENT DOCUMENTS

| | | |
|---|---|---|
| 5,452,165 A | 9/1995 | Chen et al. |
| 6,081,402 A | 6/2000 | Cho |
| 7,342,738 B1 | 3/2008 | Anderson et al. |
| 8,184,394 B2 | 5/2012 | Poorman et al. |
| 8,693,126 B2 | 4/2014 | Buckholdt |
| 9,305,596 B2 | 4/2016 | Trantham et al. |
| 9,875,758 B1* | 1/2018 | Trantham .................. G11B 5/29 |
| 2008/0137235 A1 | 6/2008 | Biskeborn et al. |
| 2014/0085751 A1 | 3/2014 | Dugas |

* cited by examiner

*Primary Examiner* — K. Wong
(74) *Attorney, Agent, or Firm* — Hollingsworth Davis, LLC

(57) ABSTRACT

A slider includes an array of two or more transducer sets offset from one another in a cross-track direction. Each transducer set includes at least one writer and at least one reader. All of the transducer sets are configured to operate simultaneously to perform any combination of reading and writing on two or more tracks of a recording medium. At least one actuator is included between two the transducer sets. The actuator is configured to adjust a cross-track spacing between the two transducer sets in response to a control current.

20 Claims, 5 Drawing Sheets

SLIDER UTILIZING MULTIPLE TRANSDUCER SETS

CROSS-REFERENCE TO RELATED APPLICATIONS

This application is a continuation of U.S. Ser. No. 15/291,290, filed Oct. 12, 2016, which is incorporated herein by reference in its entirety.

SUMMARY

The present disclosure is directed to a slider that utilizes multiple transducer sets. In one embodiment, a slider includes an array of two or more transducer sets offset from one another in a cross-track direction. Each transducer set includes at least one writer and at least one reader. All of the transducer sets are configured to operate simultaneously to perform any combination of reading and writing on two or more tracks of a recording medium. At least one actuator is included between two the transducer sets. The actuator is configured to adjust a cross-track spacing between the two transducer sets in response to a control current.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., hard disks. Since the adoption of hard disks as primary persistent data storage for personal and commercial computing, the areal density of disk drives has increased dramatically. In the last 20 years or so, the areal density of hard disk drives (and other magnetic data storage medium) has increased by a factor of more than 250.

While the increase in areal density has reduced costs of data storage, recently the areal density of hard disk drives has outpaced the growth in sequential data rate measured when reading from and writing to the drives. The reason for this can be seen by observing that areal density is increased by either increasing linear density (the density of bits along each circumferential track), or increasing track density (the number of concentric tracks per unit distance in the radial direction), or a combination of both methods. A second observation is that increases in linear density increase both sequential transfer rate and areal density at the same time and rate, while increases in track density only increase areal density. Assuming all other drive features are kept constant (RPM, seek times, disc count, etc.) that means that the amount of time required to completely read or write a drive is scaled by the increase in track density.

For example a 6 gigabit per square inch (Gbpsi) drive from circa 1998 utilized a track density of about 20 thousand tracks per inch (ktpi) while a modern version of that drive utilizes 400-500 ktpi. This means that it takes 20-25 times longer to read/write all of the data (which as noted before is about 250 times greater) on the modern drive. The problem is further exacerbated by adding discs even at the same areal density since that is effectively the same as adding more tracks, which adds capacity without necessarily any performance increase. This inability to access the data on a drive in a reasonable amount of time has a number of undesirable side effects that limit the effective utilization of the disk drive. These side effects include increasing the probability of a double-drive failure during RAID rebuild and reducing the ability to move data from one drive to another during rebalancing.

In embodiments described below, multiple readers and writers are built on a single recording head to increase the data throughput of the drive. The multiple transducers can be used simultaneously while writing and/or reading to increase throughput. Heaters or other actuators may be used to control crosstrack spacing between recording elements. Multiple read sensors per writer may be used to accommodate for skew angle spacing effects, with some or all of the sensors selectively used depending upon the track radius.

Figure 1:
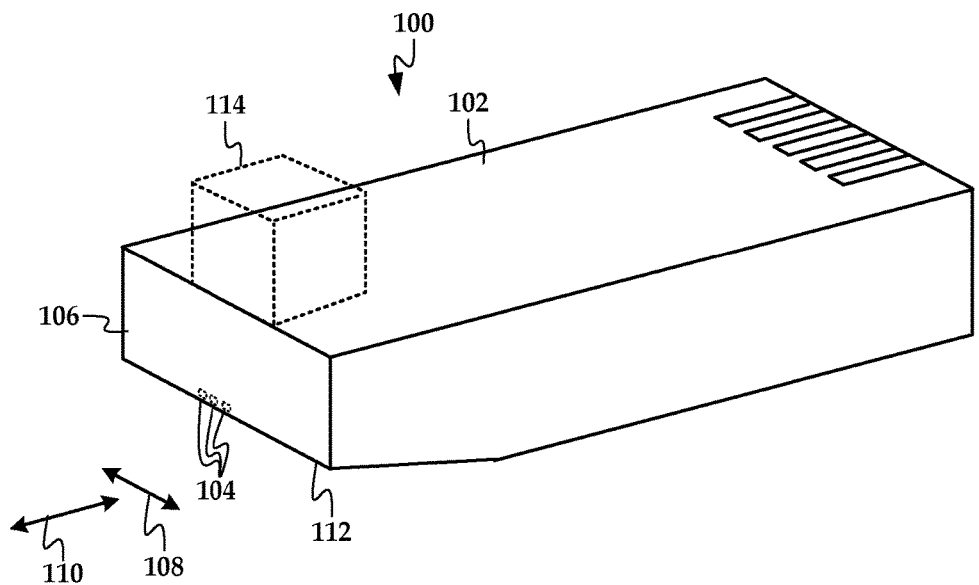
FIG. 1 is a perspective view of a slider according to an example embodiment.

In FIG. 1, a perspective view illustrates a read/write head 100 according to an example embodiment. The read/write head 100 includes a slider body 102 that includes integrated electromagnetic components. The slider body 102 is formed by building components on a unitary substrate (e.g., via layer deposition), the components including an array of two or more transducer sets 104 at a trailing edge 106. The transducer sets 104 are offset from one another in a cross-track direction 108, and may also be offset in a downtrack direction 110. Each transducer set 104 includes at least one writer and at least one reader. The transducer sets 104 are configured to operate simultaneously to perform any combination of reading and writing on two or more tracks of a recording medium (not shown).

A media facing surface 112 of the slider body 102 is held proximate over the moving recording medium when reading and writing. The media-facing surface 112 may be configured as an air-bearing surface that rides over a thin layer of air when the recording medium is moving relative to the slider body 112. The read/write head 100 may be coupled to a gimbal assembly (not shown) that suspends the slider body 102 over the recording medium. The gimbal assembly is attached to an arm (not shown) and actuator which moves the assembly in response to a control signal to position the read/write head 100 over the desired track on the recording medium.

The illustrated read/write head 100 may be configured for conventional, e.g., perpendicular magnetic recording. In other embodiments, the read/write head 100 may be configured to recording using heat-assisted magnetic recording (HAMR). In a HAMR device, an energy source (e.g., a laser diode 114) is used with integrated optics to create a small hotspot on the recording medium, which has high magnetic coercivity at room temperature which results in stability of the recorded data at high areal density. The hotspot temporarily lowers the coercivity when recording allowing a conventional write transducer to be used.

Figure 2:
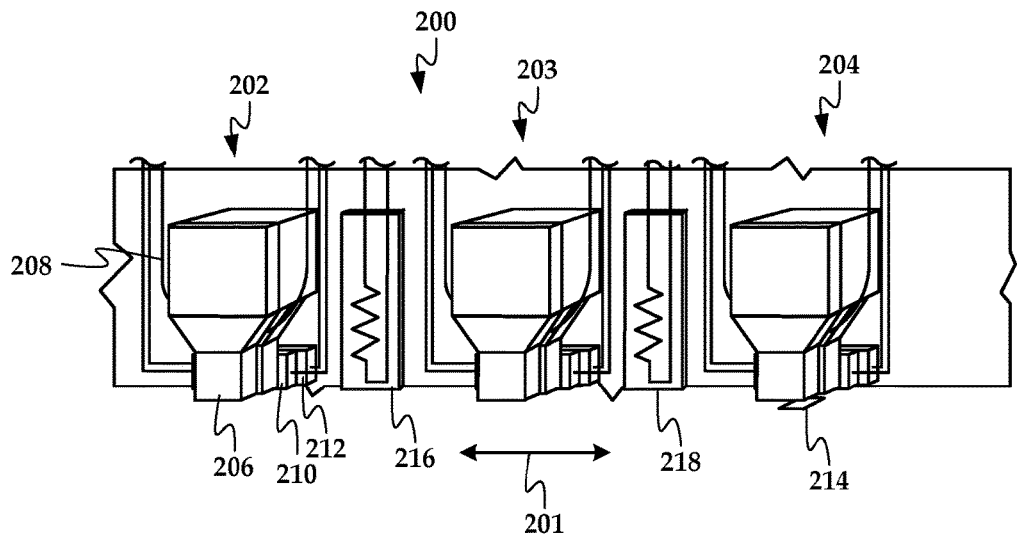
FIG. 2 is a perspective view of transducer sets according to an example embodiment.

In FIG. 2, a diagram illustrates a transducer array 200 according to an example embodiment. The transducer array 200 includes three transducer sets 202-204 offset from each other in a crosstrack direction 201. As seen here, the transducers sets 202-204 may be identical in terms of number of read and write transducers, geometry, materials, etc., although in other embodiments there may be differences between transducer sets 202-204. For purposes of illustration, member components of transducer set 202 are discussed in detail, and it will be understood that the other transducer sets 203, 204 may have the same member components in a similar arrangement.

Transducer set 202 includes a write pole 206 and a write coil 208 that generate a magnetic field that extends from a media facing surface 214 when a current is applied to the coil 208. First and second read transducers 210, 212 are configured to sense changes in magnetic orientation when held over the recording medium. The read transducers 210, 212 may be magnetoresistive sensors (e.g., giant magnetoresistive, tunneling magnetoresistive, etc.) that exhibit varying resistance in response to local changes in magnetic flux. While all the transducer sets 202-204 are shown with two read transducers, in some embodiments the transducer sets 202-204 may have different numbers of read transducers.

Shown between the transducer sets 202-204 are heaters 216, 218 that, if present, may be used to affect a crosstrack separation between the transducer sets. Generally, the heaters 216, 218 can expand by a desired amount in response to selective application of current to the heaters 216, 218. Material surrounding the heaters 216, 218 may be selected with a relatively high thermal expansion coefficient to control the amount of expansion. The heaters 216, 218 may be resistive elements with resistance R that dissipate, in response to applied current I, $I^2R$ power to the surrounding material. Generally, for N transducer sets, as many as N-1 heaters or similar actuators may be used to affect crosstrack spacing.

Other devices that affect spacing between the transducer sets without relying on thermal expansion can be used instead of or in addition to heat producing devices. For example, piezoelectric material can selectably deform in response to an applied voltage field. Another technology known as microelectromechanical systems (MEMS) involves the construction of microscopic mechanical components. One or more MEMS actuators may also be used to affect spacing between transducer sets. It will be understood that reference to heater actuators herein may apply equally to these other types of actuators.

The transducer sets 202-204 are mounted on a single slider body and can be used simultaneously for read and/or write operations. Each of the transducer sets and heaters shown in the figure may have a separate set of signal lines that extend to mainboard circuitry on the storage device (e.g., preamplifiers, controllers). Other components not shown in the figure (e.g., head-to-media clearance actuators, sensors, lasers) may similarly have independent signal lines to allow independent and simultaneous operation of the transducer sets 202-204. Common return lines (grounds) may be used to reduce the number of signal lines.

Figure 3:
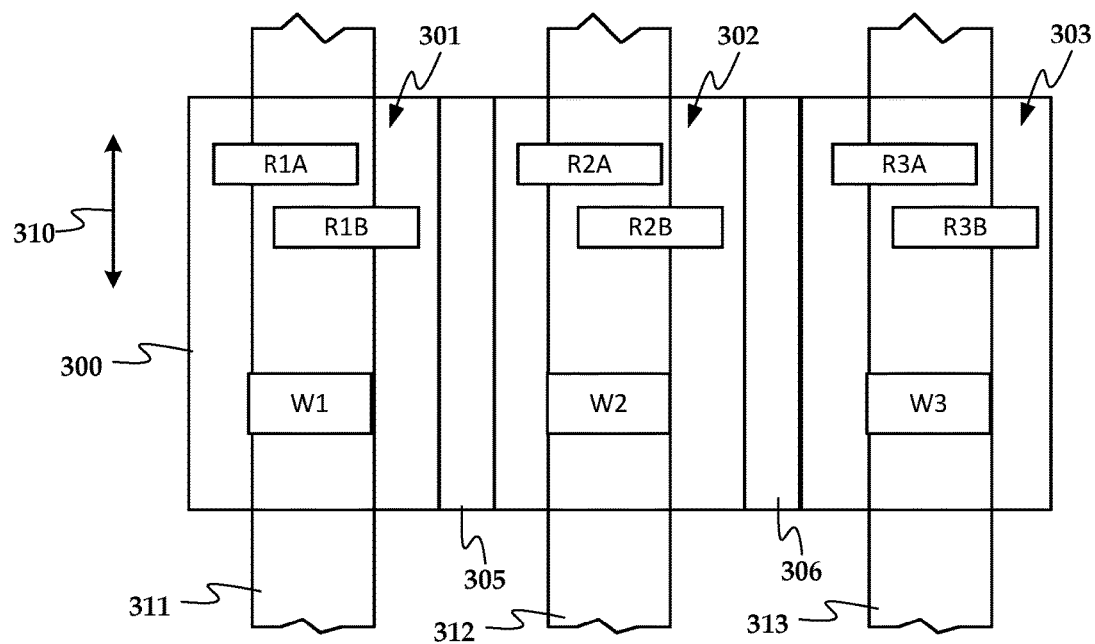
FIGS. 3-5 are plan views of transducer sets superimposed over tracks according to example embodiments.
Figure 4:
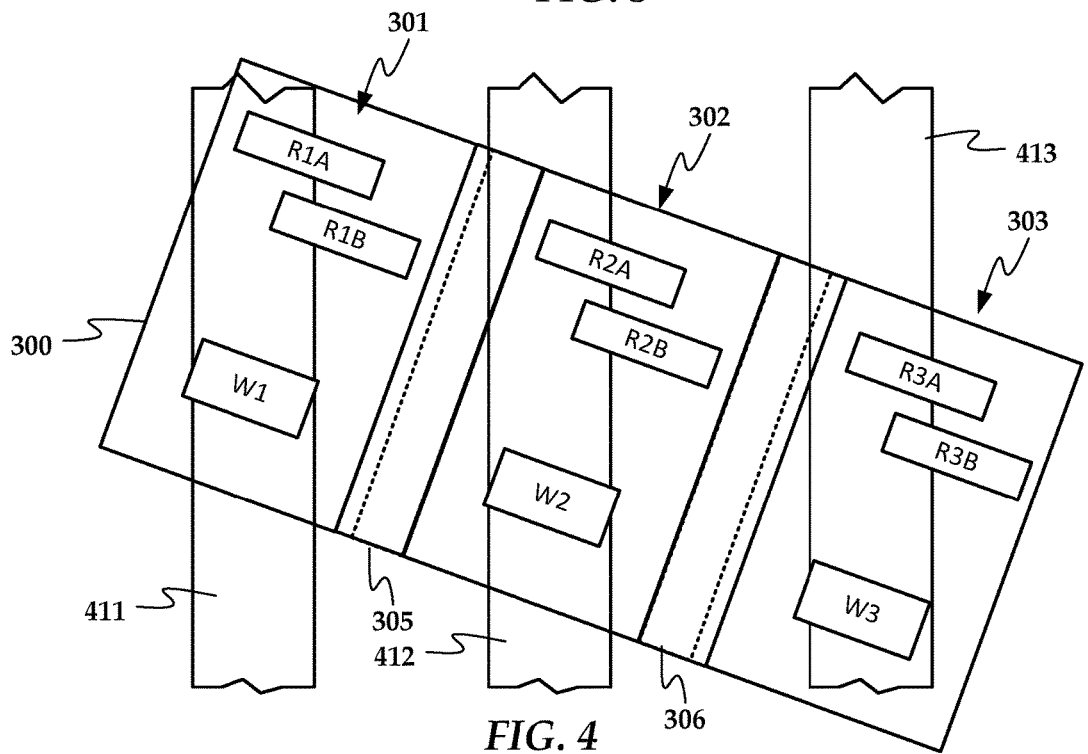
Figure 5:
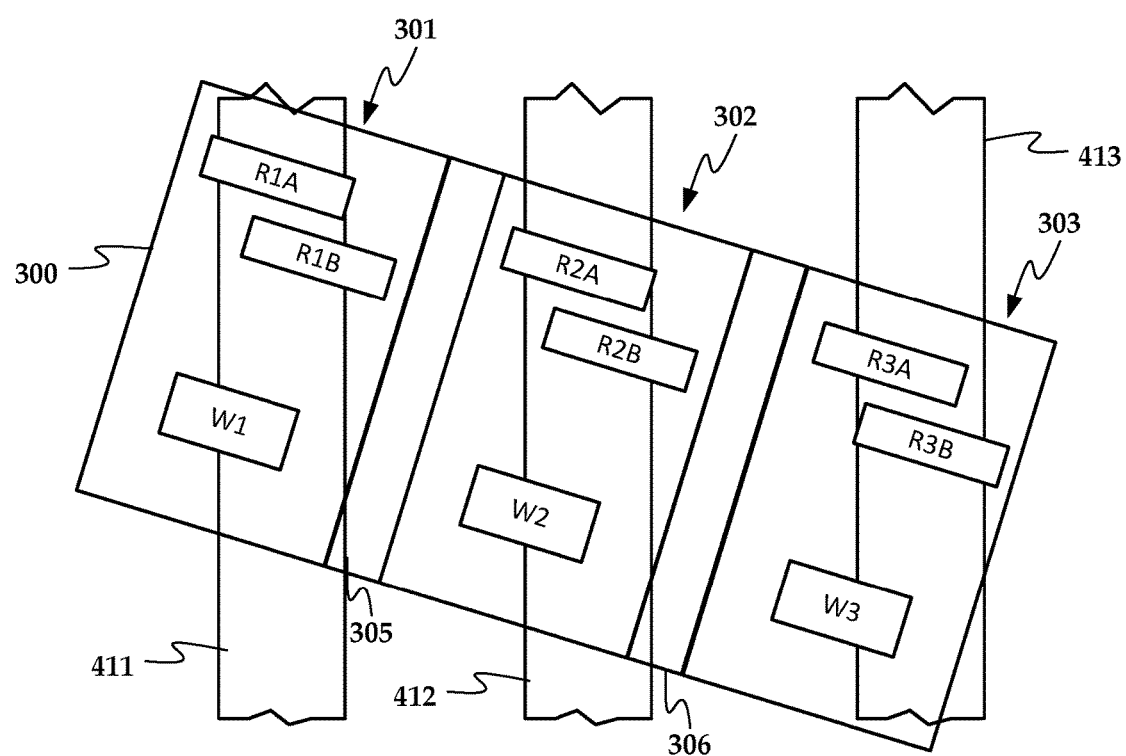

The heaters 216, 218 can be used to adjust cross track position of the read transducers and or write transducers during respective reading and writing operations. In FIGS. 3-5, plan views from a media-parallel surface shows three transducer sets 301-303 of a slider 300 according to another example embodiment. Each transducer set 301-303 has one writer (W1, W2, and W3, respectively) and two readers (R1A, R1B, R2A, R2B, R3A and R3B, respectively). Cross-track-movement actuators 305, 306 (e.g., heaters) are located between the transducer sets 301-303. The transducer sets 301-303 are shown positioned over tracks 311-313, respectively. The tracks 311-313 are written to a recording medium (e.g., magnetic disk) that moves relative to the slider 300 in a downtrack direction 310. Note that tracks 311-313 are not necessarily adjacent. There may be many tracks in-between tracks 311, 312, and 313, and in some embodiments the number of in-between tracks may vary as a function of track radius.

Note that in FIG. 3, the slider 300 is at or near a zero skew angle with the recording medium. This may be a nominal position, such that at this skew angle, the transducer sets 301-303 are configured to align with the tracks 311-313 with a nominal (e.g. median) heater biasing applied by the actuators 305-306 when the drive is operated at a nominal temperature (e.g., 40C). In FIG. 4, the slider 300 is shown over a different set of tracks 411-413 at a high skew angle. The dashed lines indicate the size of the actuators 305-306 at a low skew angle as in FIG. 3. Therefore, at the skew angle of FIG. 4, the actuators 305-306 have expanded to align the writers W1-W3 over the tracks 411-413.

The actuators 305-306 may also be used to compensate for thermal effects. For instance, the actuators 305-306 may be used to compensate for different temperatures or different values of thermal expansion of materials between the recording head. Considering FIG. 4 in a different context, the dashed lines may indicate the size of the actuators 305-306 at a cooler temperature. The solid lines may represent the size of the actuators when extra heater current is applied to compensate for the cooler drive temperature. Conversely, less heater current may be applied when the drive's operating temperature is hotter.

The actuators 305-306 may be used similarly to align the readers R1A-B, R2A-B, and R3A-B over the tracks 411-413. However, because the readers R1A-B, R2A-B, and R3A-B in each transducer set 301-303 are offset from each other in a crosstrack direction, such readers may be able to operate without active crosstrack alignment via the actuators 305-306. This is seen in FIG. 5, where the slider is positioned over the tracks 411-413 without expansion of the actuators. At least readers R1A, R2A and R3C are centered over the tracks 411-413. Further, the signal from two readers over the same track (e.g., R1A and R2A over track 411) may be combined when reading the track, e.g., using multiple signal/sensor magnetic recording (MSMR) mode that uses two or more signals to read from a single track, or in a two-dimensional magnetic recording—multi-track (TDMR-MT) mode, where multiple readers are used to read from more than one track. Both MSMR and TDMR-MT modes are specific cases of TDMR. The multiple readers may be from the same transducer set or from different, adjacent transducer sets.

In the above embodiments, the transducer sets are shown aligned with one another in a crosstrack direction. In other embodiments, at least some of the transducers in the sets may also be offset in a downtrack direction. For example, the sets may have the same downtrack separation between readers and writers within the set, but the sets are offset from one another downtrack. In another case, the sets may have different separation between readers and writers. For example, the writers of all the sets may be crosstrack-aligned but the readers may be offset in a downtrack direction.

A hard disk drive generally uses a servo control system to position read/write heads over tracks on the recording medium. In order to determine the location of the read/write head, the recording medium includes servo marks prewritten onto the disk at multiple locations. The servo marks include data that helps identify the current position (e.g., track and sector number) as well as to determine the offset of the read/write head relative to track center. In the embodiment described herein where cross track adjustment of transducer sets is possible, the servo control system may include additional features to control the simultaneous tracking of two or more transducer sets over different tracks.

Figure 6:
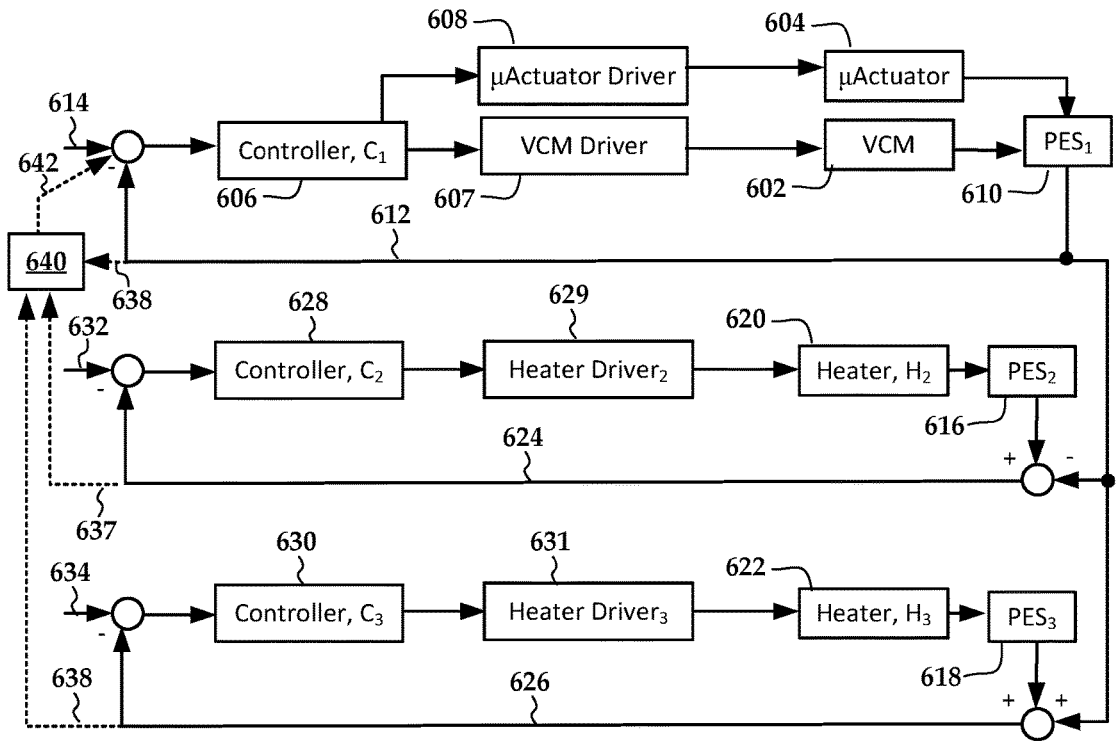
FIG. 6 is a block diagram of a servo controller system according to an example embodiment.

In FIG. 6, a block diagram illustrates a servo control system according to an example embodiment. A plant of the servo control system includes a voice coil motor (VCM) 602 that moves some or all of the read/write heads of the device together. One or more microactuators 604 may be incorporated to provide fine-position adjustment for each individual read/write head. Together, the VCM 602 and microactuator 604 affect the displacement 610 of a first transducer set. A reader of the first transducer set reads position data 612 (e.g., based on burst patterns embedded in servo marks) and this position data 612 is fed back to the controller 606,. A command input 614 is used to set position, and is zero for track-following mode. The difference between the command input 614 and actual position 614 is position error $PES_1$ for this transducer set, which is ultimately the feedback signal sent to the controller 606. The controller 606 causes actuation of the VCM 602 and microactuator 604 via respective drivers 607, 608.

Because the illustrated system includes more than one transducer set (three transducer sets in this example) on the same read/write head, the movement of the VCM 602 and microactuator 604 also affects the displacements 616, 618 of second and third transducer sets. The displacement of the second and third transducer sets relative to the first transducer set is controlled by respective heaters 620, 622. Readers of the second and third transducer sets provide respective position signals 624, 626 which are used as feedback to controllers 628, 630. Controllers 628, 630 cause actuation of the heaters 620, 622 via drivers 629, 631. Command signals 632, 634 are combined with position signals 624, 626 and fed back to the second and third transducer sets via the controllers 628, 630.

In this example, the heaters 620, 622 are on either side of the first transducer set that provides the position signal 612. Therefore, this signal 612 is subtracted from position 616 of the second transducer set and added to the position 618 of the third transducer set. In other arrangements, the signal 612 may be added to or subtracted from both positions 616, 618. For example, this may occur where the first transducer set is at one end of the array and not in the middle.

Note that the command input 614 affects all three of the transducer sets, while command inputs 632, 634 only affect position of second and third transducer sets relative to the first. Thus, command input 614 may be used for seeking, track switching, and the like, but not command inputs 632, 634. During track-following mode, all three inputs 614, 632, 634 may be set to zero. In some cases, additional servo control data such as repeatable runout (RRO) compensation may be used to induce intentional position offsets from the servo marks due to known distortions of the servo patterns on the disk. Each of the transducers may be affected by the same RRO, in which case the primary actuators 602, 604 can be the primary mechanism for RRO correction. However, the heaters 620, 622 provide the possibility of correcting for repeatable position error differences between adjacent tracks, e.g., by using command signals 632, 634 for RRO correction.

The position signal 612 read from the first transducer set is shown being used to control the primary actuators 602, 604. As indicated by dashed lines 636-638, the outputs of all the position signals 612, 624, 626 may be combined, as indicated by processing block 640. The combined output 642 of these signals may be used instead of signal 612 or in addition to signal 612 to control the primary actuators 602, 604. For example, the signals 612, 624, 626 may exhibit a common mode that more accurately estimates position of the read/write head than any one signal. The differences between the signals 612, 624, 626 may be used to drive the heaters 620, 622 instead of or in addition to the raw position data 624, 626.

Figure 7:
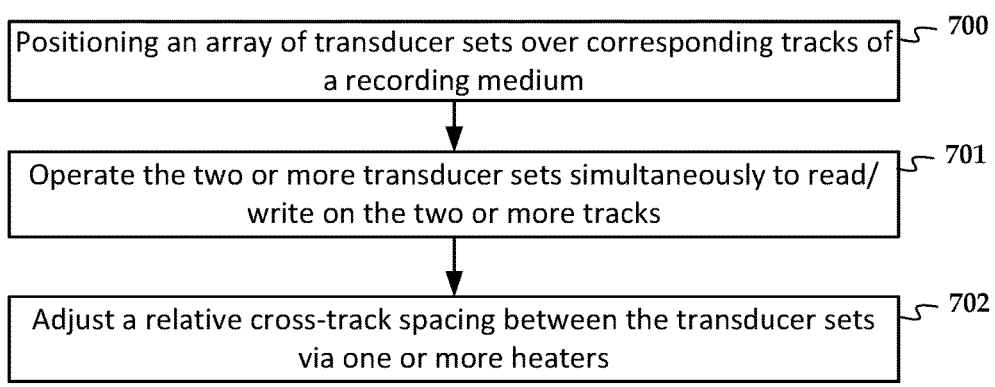
FIG. 7 is a flowchart of a method according to an example embodiment.
Figure 8:
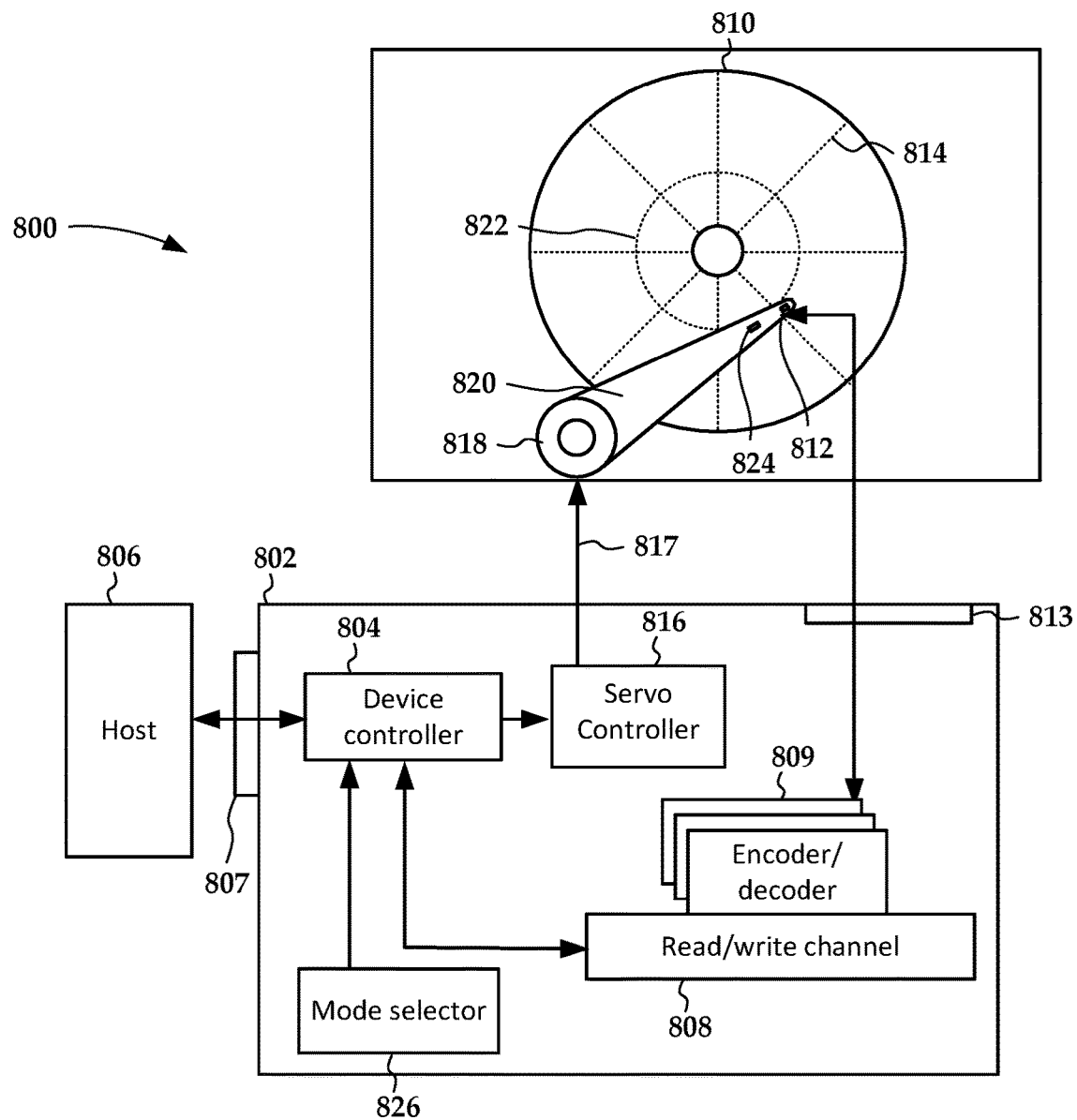
FIG. 8 is a block diagram of a data storage device according to an example embodiment.

In FIG. 7, a flowchart shows a method according to an example embodiment. The method involves positioning 700 an array of two or more transducer sets over two or more corresponding tracks of a recording medium. The two or more transducers are offset from one another in a cross-track direction. Each transducer set includes at least one writer and at least one reader. The two or more transducer sets are operated 701 simultaneously to perform any combination of reading and writing on the two or more corresponding tracks. A relative cross-track spacing between the transducer sets is adjusted 702 via one or more heaters located between the two or more transducer sets In FIG. 8, a diagram illustrates components of a hard drive apparatus 800 that utilizes one or more read/write heads 812 according to example embodiments. The apparatus includes circuitry 802 such as a system controller 804 that processes read and write commands and associated data from a host device 806 via a host interface 807. The system controller 804 may include an application specific integrated circuit or chipset with a central processing unit and other application-specific circuitry (e.g., digital signal processing circuitry). The host interface 807 includes circuitry that enables electronic communications via standard bus protocols (e.g., SATA, SAS, PCI, Ethernet, etc.). The host device 806 may include any electronic device that can be communicatively coupled to store and retrieve data from a data storage device, e.g., a computer, a server, a storage controller. The controller 804 is coupled to a read/write channel 808 that communicates with read/write heads that read from and write to surfaces of one or more rotating magnetic media, e.g., magnetic disks 810.

The read/write channel 808 generally converts data between the digital signals processed by the controller 804 and the analog signals conducted through one or more HGAs 812 during read operations. At least one of the HGAs 812 includes two or more transducer sets capable of concurrently reading from and writing to different tracks of one of the disks 810. Generally, each of the transducer sets includes at least one reader and one writer, and in some configurations, the transducers sets include two or more readers. The read transducers can be selectively activated, e.g., activating different single readers to account for different skew angles of the HGA 812, activating different numbers of readers to operate in different modes (e.g., TDMR, MSMR, conventional), etc.

The read/write channel 808 may include analog and digital circuitry such as decoders, timing-correction units, error correction units, etc. The read/write channel is coupled to the HGAs 812 via interface circuitry 813 that may include preamplifiers, filters, digital-to-analog converters, analog-to-digital converters, etc. As shown in the figure, the read/write channel 808 is capable of using multiple encoder/decoders 809, as well as multiple instances of other functional components (e.g., preamplifiers, filters, equalizers, detectors). The multiple encoders/decoders 809 and other circuits allow for simultaneous reading/writing from two or more transducer sets on an HGA 812.

In addition to processing user data, the read/write channel 808 reads servo data from servo wedges 814 on the magnetic disk 810 via the read/write head. All of the multiple readers of the HGAs 812 may be used to read servo data, or only a subset thereof. The servo data are sent to a servo controller 816, which uses the data to provide position control signals 817 to one or more positioning mechanisms, which may include at least a VCM 818, arm 820, and optionally microactuators 824. The VCM 818 rotates the arm 820 upon which the read/write heads 812 are mounted in response to the control signals 817. The position control signals 817 may also be sent to microactuators 824 that individually control each of the HGAs 812, e.g., causing small displacements at each read/write head.

The transducer sets on the HGAs 812 are separated by cross-track displacement actuators, e.g., heaters. The servo controller 816 includes heater controllers to selectively actuate the heaters to affect cross-track spacing of the transducer sets. This can be done in both read and write modes. The heaters may be dynamically controlled in a closed-loop mode (e.g., as shown in FIG. 6) or in an open loop mode. For example, a predetermined heater actuator setting may be used based on current track or zone, which affects the skew angle of the read write head.

A mode selector module 826 is a functional component that can process a control message from the host 806 via the host interface 807. The message includes data (e.g., command descriptor block) that causes the mode selector module 826 to select a different mode of the device 800, e.g., selecting readers based on angle of skew, single-signal-per-track, MSMR, TDMR, etc. For example, the read/write channel 808 can send a signal to the HGAs 812 to activate or deactivate readers based on the selected mode. An appropriate decoder 809 can be selected for use with the selected readers. Other functionality, such as that of the servo controller 816, clearance control (not shown), can also be altered by the change of mode in response to the mode selector 826.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

What is claimed is:

1. A method comprising:
    positioning a slider over a disk via a positioning mechanism, the slider comprising first and second transducer sets, the first and second transducer sets offset from one another in a cross-track direction, each transducer set comprising at least one reader, an actuator located between the first and second transducer sets and configured to change a crosstrack spacing between the first and second transducer sets;
    reading first position data from the disk via a first reader of the first transducer set;
    reading second position data from the disk via a second reader of the second transducer set;
    using the first position data to position the first transducer set over a first track via the positioning mechanism; and
    using the second position data to position the second transducer set over a second track via the actuator.

2. The method of claim 1, wherein the positioning mechanism comprises a voice coil and a microactuator.

3. The method of claim 1, wherein the actuator comprises a heater that changes the crosstrack spacing between the first and second transducer sets via thermal expansion.

4. The method of claim 1, wherein the slider further comprises a third transducer set and a second actuator configured to change a second crosstrack spacing between the third transducer set and the first and second transducer sets, the method further comprising:
    reading third position data from the disk via a third reader of the third transducer set; and
    using the third position data to position the third transducer set over a third track via the actuator.

5. The method of claim 4, wherein the first transducer set is located between the second and third transducer sets, and wherein a servo controller subtracts the first position signal from the second position signal to determine a second position error of the second transducer set and adds the first position signal to the third position signal to determine a third position error of the third transducer set.

6. The method of claim 1, wherein the second position data is combined with the first position data to control the positioning mechanism.

7. The method of claim 1, further comprising determining different first and second repeatable runout values affecting the first and second transducer sets, wherein the second repeatable runout values are combined with the second position data to position the second transducer set over the second track via the actuator.

8. The method of claim 1, further comprising applying a temperature compensation signal to the actuator to adjust for variations in the crosstrack spacing due to temperature.

9. The method of claim 1, further comprising applying a skew compensation signal to the actuator to adjust for a skew angle of the slider.

10. An apparatus comprising:
    interface circuitry operable to communicate with a slider, the slider comprising first and second transducer sets, the first and second transducer sets offset from one another in a cross-track direction, each transducer set comprising at least one reader, an actuator being located between the first and second transducer sets and configured to change a crosstrack spacing between the first and second transducer sets; and
    a servo controller coupled to the interface circuitry and a positioning mechanism operable to position the slider over a disk, the servo controller configured to:
    read first position data from the disk via a first reader of the first transducer set; read second position data from the disk via a second reader of the second transducer set,
    use the first position data to position the first transducer set over a first rack via the voice coil motor; and
    use the second position data to position the second transducer set over a second track via the actuator.

11. The apparatus of claim 10, wherein the positioning mechanism comprises a voice coil and a microactuator.

12. The apparatus of claim 10, wherein the actuator comprises a heater that changes the crosstrack spacing between the first and second transducer sets via thermal expansion.

13. The apparatus of claim 10, wherein the slider further comprises a third transducer set and a second actuator configured to change a second crosstrack spacing between the third transducer set and the first and second transducer sets, the servo controller being further operable to:

read third position data from the disk via a third reader of the third transducer set; and use the third position data to position the third transducer set over a track via the actuator.

14. The apparatus of claim 10, wherein the first transducer set is located between the second and third transducer sets, and wherein the servo controller subtracts the first position signal from the second position signal to determine a second position error of the second transducer set and adds the first position signal to the third position signal to determine a third position error of the third transducer set.

15. The apparatus of claim 10, wherein the second position data is combined with the first position data to control the positioning mechanism.

16. The apparatus of claim 10, wherein the servo controller is further operable to determine different first and second repeatable runout values affecting the first and second transducer sets, wherein the second repeatable runout values are combined with the second position data to position the second transducer set over the second track via the actuator.

17. The apparatus of claim 10, wherein the servo controller is further operable to apply a compensation signal to the actuator to adjust for at least one of a skew angle of the slider and a variation in the crosstrack spacing due to temperature.

18. A system comprising:
a slider comprising:
an array of two or more transducer sets offset from one another in a cross-track direction, each set comprising at least one reader, all of the transducer sets configured simultaneously to read from two or more tracks of a disk; and
an actuator between two of the transducer sets, the actuator configured to adjust a crosstrack spacing between the two transducer sets in response to a control current;
a positioning mechanism operable to move the slider between an inner diameter and an outer diameter of the disk; and
a servo controller coupled to the slider and the positioning mechanism, the servo controller configured to:
control a position of the slider based on a first position signal from a first of the two or more transducer sets; and
control the position of a second of the two or more transducer sets via the actuator based on a second position signal of the second transducer set.

19. The system of claim 18, wherein the servo controller is further operable to apply a compensation signal to the actuator to adjust for at least one of a skew angle of the slider and a variation in the crosstrack spacing due to temperature.

20. The system of claim 19, wherein the servo controller is further operable to determine different first and second repeatable runout values affecting the first and second transducer sets, wherein the first repeatable runout values are applied to the positioning mechanisms to position the two or more transducer sets and wherein the second repeatable runout values are applied to the actuator to position just the second transducer set.

* * * * *